United States Patent [19]

Itoh et al.

[11] Patent Number: 5,155,191

[45] Date of Patent: Oct. 13, 1992

[54] PREPARATION PROCESS OF GRANULAR POLYMERS

[75] Inventors: Hiroshi Itoh, Yokohama; Takashi Abe, Kamakura; Kouji Ohkoshi, Zushi; Atsuhiko Nitta, Yokohama, all of Japan

[73] Assignee: Mitsui Toatsu Chemicals, Incorporated, Tokyo, Japan

[21] Appl. No.: 835,115

[22] Filed: Feb. 14, 1992

Related U.S. Application Data

[63] Continuation of Ser. No. 499,344, filed as PCT/JP89/01103, Oct. 26, 1989, abandoned.

[30] Foreign Application Priority Data

Oct. 27, 1988 [JP] Japan ............................. 63-269479

[51] Int. Cl.⁵ .................. C08F 20/54; C08F 20/56; C08F 26/06; C08F 4/12
[52] U.S. Cl. ................................ 526/226; 526/126; 526/233; 526/234; 526/236; 526/237; 526/258; 526/265; 526/303.1; 526/307.2; 526/310; 526/312; 528/422; 528/423
[58] Field of Search ............... 526/258, 237, 226; 528/422, 423

[56] References Cited

U.S. PATENT DOCUMENTS

| | | | |
|---|---|---|---|
| 4,224,427 | 9/1980 | Mueller | 526/93 |
| 4,548,990 | 10/1985 | Mueller | 525/123 |
| 4,739,009 | 4/1988 | Heide | 524/801 |
| 4,914,159 | 4/1990 | Börner et al. | |

OTHER PUBLICATIONS

Supplemental European Search Report.

*Primary Examiner*—Joseph L. Schofer
*Assistant Examiner*—Fred Zitomer
*Attorney, Agent, or Firm*—Oblon, Spivak, McClelland, Maier & Neustadt

[57] ABSTRACT

By dispersing and polymerizing at least one N-alkyl-or N-alkylene-substituted (meth)acrylamide or a mixture of at least one N-alkyl- or N-alkylene-substituted (meth)acrylamide and other copolymerizable monomer is an aqueous inorganic salt solution having inorganic particulates suspended, there is provided a preparation process of granular polymers containing no impurities such as polymer stabilizers, surface active agents, etc. The granular polymers are useful as concentrating agents, slow releasing base materials, etc.

12 Claims, No Drawings

PREPARATION PROCESS OF GRANULAR POLYMERS

This application is a continuation-in-part of application Ser. No. 07/499,344, filed as PCT/JP89/01103, Oct. 26, 1989, now abandoned.

TECHNICAL FIELD

This invention relates to a process for preparing granular polymers. More particularly, it relates to a process for preparing granular polymers comprising polymers of specific (meth)acrylamide derivatives.

BACKGROUND OF THE INVENTION

Water-insolubilized polymers of specific (meth)acrylamide derivatives absorb water in aqueous solutions to form hydrated gels. The hydrated gels have a temperature-dependent nature according to which the amount of water absorbed therein varies with temperature. Making use of this characteristic, it has been desired to develop their applications in various field. Further, it is known that water-insolubilized polymers of the (meth)acrylamide derivatives are inherently rendered hydrophobic by heating and hydrophilic by cooling in aqueous solutions, that is, they have a characteristic of varying their nature from hydrophobic to hydrophilic or vice versa with temperature. As a result, their application to separation functional materials has also been investigated, for instance, as in U.S. Pat. Nos. 4,729,834, 4,683,258 and 4,828,710, which are the patent applications of the present inventors.

In all of these cases, however, it is necessary to form the materials into shapes in accordance with their uses, and in the application to separation functional materials in particular, preparation of granular polymers is indispensable.

As conventional processes for preparing granular polymers, there are the suspension polymerization process using water as the continuous phase for hydrophobic polymers and the so-called reverse phase suspension polymerization process using oil as the continuous phase for hydrophilic polymers.

(Meth)acrylamide derivatives generally combine both hydrophobic and hydrophilic properties to a more or lesser extent. Accordingly, the application of conventional techniques as is may often lead to failure in the production of granular polymers by the foregoing processes.

For example, in the suspension polymerization using water as the continuous phase, (meth)acrylamide derivatives are often soluble in water. In such cases, it has been attempted to reduce their solubilities through salting-out effects by the addition of water-soluble inorganic salts. In such case, however, it has been necessary to add various additives, for instance, polymer stabilizers such as sodium polyacrylate and carboxymethyl cellulose and, in some cases, surface active agents such as sodium dodecylbenzenesulfonate to the aqueous solutions in which the inorganic salts are dissolved at high concentrations, as shown in Kobunshi Ronbun-shu (High Polymer Report) Vol. 40 No. 7, p441–447 (1983).

Therefore, in the production of granular polymers according to the foregoing processes, it has been unavoidable to involve difficult and troublesome operations, such as, stable dissolution or dispersion of the above various additives prior to polymerization, stable maintenance of the dispersed state during polymerization, washing-out of the above additives from the granular polymers after polymerization, etc. These operations raise serious problems in the production of granular polymers The present inventors have discovered that granular polymers can be prepared favorably even in the absence of the foregoing additives by polymerizing the derivatives in aqueous inorganic salt solutions in which inorganic particulates are suspended.

SUMMARY OF THE INVENTION

It is an object of the present invention to provide a process for the efficient preparation of a uniform fine granular polymer.

It is another object of the present invention to provide a preparation process which can be employed in the production of both hydrophobic and hydrophilic fine granular polymers.

It is a further object of the present invention to provide, in the suspension polymerization process using water as the continuous phase, a preparation process of fine granular polymers in which the addition of polymer stabilizers, surface active agents, etc. is not required.

The foregoing objects of the present invention can be achieved by the provision of a preparation process of a granular polymer which comprises dispersing and polymerizing at least one N-alkyl- or N-alkylene-substituted (meth)acrylamide represented by the general formula (I) or (II):

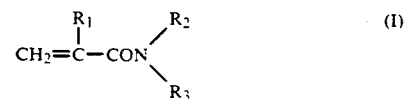

wherein $R_1$ is a hydrogen atom or a methyl group, $R_2$ is a hydrogen atom or a methyl or ethyl group, and $R_3$ is a methyl, ethyl or propyl group,

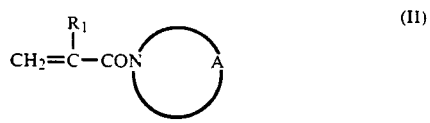

wherein $R_1$ is a hydrogen atom or a methyl group and A is $-CH_2)_n$ wherein n is 4–6 or $-CH_2-(_2O-CH_2-)_2$, or a mixture of at least one of the above-described N-alkyl- or N-alkylene-substituted (meth)acrylamides and other copolymerizable monomer in an aqueous inorganic salt solution in which fine inorganic particulates are suspended.

According to the process of the present invention described above, granular polymers capable of varying swelling water content with temperature can be prepared The process of the present invention has the following characteristics.

(1) A granular polymer made of the copolymer with a highly lipophilic monomer such as styrene can also be prepared favorably.

(2) The stable preparation of granular polymers without addition of surface active agents or organic stabilizers such as water-soluble polymers may permit the production of spherical, transparent and uniform granular polymers such a pearls which are not contaminated with organic materials.

(3) The presence of inorganic particulates on the surface of polymer granules makes it possible to control the electric charges on the surface of the dry granules.

BEST MODE FOR CARRYING OUT THE INVENTION

The specific (meth)acrylamide derivatives useful in the practice of the present invention are N-alkyl- or N-alkylene-substituted (meth)acrylamide represented by the general formula (I) or (II). Specifically, they may include, for example, N-ethylacrylamide, N,N-diethylacrylamide, N-ethylmethacrylamide, N,N-dimethylacrylamide, N,N-dimethylmethacrylamide, N-isopropylacrylamide, N-n-propylacrylamide, N-isopropylmethacrylamide, N-n-propylmethacrylamide, N-acryloylpyrrolidine, N-methacryloylpyrrolidine, N-acryloylpiperidine, N-methacryloylpiperidine, N-acryloylhexahydroazepine and N-acryloylmorpholine. Among these monomers, those which are liquid and have large solubilities to water are preferred from the standpoint of polymerization. Specifically, they may include, for instance, N-ethylacrylamide, N,N-diethylacrylamide, N-ethylmethacrylamide, N,N-dimethylacrylamide, N,N-dimethylmethacrylamide, N-n-propylacrylamide, N-acryloylpyrrolidine, N-methacryloylpyrrolidine, N-acryloylpiperidine and N-acryloylmorpholine.

As monomers copolymerizable with the aforesaid monomer may be cited lipophilic monomers, hydrophilic monomers, ionic monomers, etc., and at least one of these monomers may be used in the copolymerization. Specific lipophilic monomers may include, for example, N-alkyl(meth)acrylamide derivatives such as N,N-di-n-propylacrylamide, N-n-butylacrylamide, N-n-hexylacrylamide, N-n-hexylmethacrylamide, N-n-octylacrylamide, N-n-octylmethacrylamide, N-tert-octylacrylamide, N-n-dodecylacrylamide and N-n-dodecylmethacrylamide, N-(ω-glycidoxyalkyl)-(meth)acrylamide derivatives such as N,N-diglycidylacrylamide, N,N-diglycidylmethacrylamide, N-(4-glycidoxybutyl)acrylamide, N-(4-glycidoxybutyl)methacrylamide, N-(5-glycidoxypentyl)acrylamide and N-(6-glycidoxyhexyl)acrylamide, (meth)acrylate derivatives such as ethyl acrylate, methyl methacrylate, butyl methacrylate, butyl acrylate, lauryl acrylate, 2-ethylhexyl methacrylate and glycidyl methacrylate, acrylonitrile, methacrylonitrile, vinyl acetate, vinyl chloride, vinylidene chloride, olefins such as ethylene, propylene and butene, styrene, divinylbenzene, α-methylstyrene, butadiene and isoprene.

The hydrophilic monomers may embrace, for example, acrylamide, methacrylamide, diacetone acrylamide, hydroxyethyl methacrylate, hydroxyethyl acrylate, hydroxypropyl methacrylate, hydroxypropyl acrylate, various methoxypoleethyleneglycol (meth)acrylates and N-vinyl-2-pyrrolidone. Hydrophilic property may also be imparted to the copolymer by introducing vinyl acetate, glycidyl methacrylate, etc. through copolymerization followed by hydrolysis.

As the ionic monomer may be mentioned, for example, acids such as acrylic acid, methacrylic acid, vinylsulfonic acid, allylsulfonic acid, methallylsulfonic acid, styrenesulfonic acid, 2-acrylamido-2-phenylpropanesulfonic acid and 2-acrylamido-2-methylpropanesulfonic acid and salts thereof, and amines such as N,N-dimethylaminoethyl methacrylate, N,N-diethylaminoethyl methacrylate, N,N-dimethylaminoethyl acrylate, N,N-dimethylaminopropylmethacrylamide and N,N-dimethylaminopropylacrylamide and salts thereof. Ionic property may also be imparted to the copolymer by introducing various acrylates, methacrylates, acrylamide, methacrylamide, acrylonitrile, etc. through copolymerization followed by hydrolysis.

In the process of the present invention, the combination of the aforesaid specific (meth)acrylamide derivative with a lipophilic monomer, among the foregoing three types of copolymerizable monomers, may permit the process of the present invention to be carried out most effectively. The quantitative proportion of the (meth)acrylamide derivative to the lipophilic monomer may vary with the kind of the monomers and their combination and hence cannot be specified sweepingly. However, the content of the lipophilic monomer is generally 80% by weight or less, preferably 70% by weight or less, of the total monomers. In the case of the hydrophilic and ionic monomers, on the other hand, their contents are individually as low as 40% by weight or less, preferably 20% by weight or less in the total monomers.

A granular polymer having swelling nature with a solvent such as water can also be prepared through polymerization by adding a crosslinking monomer to the aforesaid monomer(s). As the crosslinking monomer, there are two kinds of monomers, one having at least two polymerizable groups in the molecule and one having a functional group which induces crosslinking by a post-treatment such as heating after polymerization. As the former monomer which has at least two double bonds in one molecule, there may specifically be cited, for example, alkylenebisacrylamides such as methylenebisacrylamide, ethylenebisacrylamide and piperidineacrylamide, alkylene-di(meth)acrylates such as ethylenedi(meth)acrylate, di(meth)acrylates of various bisphenol A derivatives such as polyethyleneglycol di(meth)acrylate and bisphenol A di(meth)acrylate, di-, tri- or tetra-(meth)acrylic esters of polyhydric alcohols such as glycerol and pentaerythritol, di- or tri-(meth)acrylate of ethylene oxide-modified phosphoric acid, oligoester (meth)acrylate, polyester (meth)acrylate, urethane acrylate, and di- or tri(meth)acrylic esters of isocyanulates and derivatives thereof.

On the other hand, the latter crosslinking monomer may include, for example, N-alkoxymethyl(meth)acrylamides such as N-methylolacrylamide, N-methylolmethacrylamide, N-methoxymethylacrylamide, N-ethoxymethylacrylamide, N-n-propoxymethylacrylamide, N-n-butoxymethylacrylamide, N-n-butoxymethylmethacrylamide, N-isobutoxymethylacrylamide and N-t-octoxymethylacrylamide.

The amount of the crosslinking monomer to be added to the aforesaid monomer(s) may vary in a very wide range, so that the swelling degree of the polymer can be controlled at will in various solvents. Further, the granular polymer may be prepared without addition of the crosslinking monomer, forming a solvent-soluble polymer Further, the addition of an organic liquid having no polymerizing ability to the aforesaid monomer(s) makes it possible to facilitate the formation of oil droplets and to make the structure of the resulting granular polymer porous. Any organic liquids which form oil droplets in aqueous inorganic salt solutions can be employed for the above-described purposes. They may specifically include n-octane, cyclohexane, benzene, toluene, chlorobenzene, dichlorobenzene, trichlorobenzene, chloroform, methylchloroform, dichloroethane, trichloroethylene, ethyl acetate, ethyl chloroacetate, diethyl ketone, octyl alcohol, ethylene glycol dibutyl ether, N-methylpyrrolidone, N,N-dimethylformamide, N,N-dimethylacetamide, etc.

Regarding the composition of the continuous phase for dispersing the foregoing monomers, namely, of the inorganic salt solution having inorganic particulates suspended: in the process of the present invention, the aforesaid inorganic particulates must function to interfere with the merger of the monomer oil droplets under polymerization and stabilize the droplets. To achieve this purpose, it is essential to minimize the particle size because of the following reasons. One of the reasons is that the smaller the particle size, the larger is the number of particulates when the same amounts are added, so that the merger of the monomer oil droplets can be prevented more effectively. Another reason is such that the finer the particle size, the higher is the viscosity of the suspension, so that the granules can be prevented from merging by its viscous effect. The effective particle size depends on the kind of the inorganic particulates used and hence is not unconditional, but it ranges generally from 0.005 to 50 $\mu$m, preferably from 0.01 to 2 $\mu$m, and more preferably from 0.015 to 15 $\mu$m. The particulates may take various shapes, for instance, cubic, needle, fusiform, flak-y, amorphous, columnar and spherical. The suspensions of fine inorganic particulates with particle sizes in the above range can retain stably the sol state of favorable grain size even under stoppage of agitation. In the present invention, determination of the particle size is made by sieving, microphotography, the sedimentation method, etc.

The amount of the inorganic particulates to be added is in the range of 10–60% by weight, preferably 15–50% by weight based on the aqueous solution having a water-soluble inorganic salt dissolved. The viscosity of the resulting suspension ranges generally from 10 to 20,000 centipoises, preferably from 100 to 10,000 centipoises.

Any inorganic particulates may be employed in the suspension so far as they are insoluble in water, and various metal carbonates, metal oxides, metal hydroxides, metal phosphates, metal sulfates, metal sulfites, clay minerals, etc. may be mentioned by way of example. More particularly, the metal carbonates are hardly water-soluble alkali metal carbonates, alkaline earth metal carbonates and other polyvalent metal carbonates, and may include, for example, lithium carbonate, calcium carbonate, barium carbonate, magnesium carbonate, strontium carbonate, beryllium carbonate, cadmium carbonate, cobalt carbonate, lead carbonate, nickel carbonates and manganese carbonates. The metal oxides are alkaline earth metal oxides and other polyvalent metal oxides, including, for example, calcium oxide, barium oxide, magnesium oxide, beryllium oxide, zinc oxide, aluminum oxide, antimony oxide, cadmium oxide, silicon oxides, chromium oxides, cobalt oxides, tin oxides, titanium oxides and lead oxides. The metal hydroxides are alkaline earth metal hydroxides and other polyvalent metal hydroxides, and may, for example, include calcium hydroxide, barium hydroxide, magnesium hydroxide, aluminum hydroxide, cadmium hydroxide, iron hydroxides and nickel hydroxides. The metal phosphates are hardly-water-soluble alkali metal phosphates and alkaline earth metal and other polyvalent metal phosphates, and their secondary and tertiary salts may be applied. They may, for example, include lithium phosphate, calcium phosphate, barium phosphate, magnesium phosphate, iron phosphates, zinc phosphate and lead phosphates. The metal sulfates are alkaline earth metal sulfates and other polyvalent metal sulfates, and may, for example, include calcium sulfate, barium sulfate, magnesium sulfate, zinc sulfate, chromium sulfates, mercury sulfates and lead sulfates. The metal sulfites are alkaline earth metal sulfites and other polyvalent metal sulfites, and may, for example, include calcium sulfite, barium sulfite, magnesium sulfite, cadmium sulfite, iron sulfites, lead sulfite, silver sulfite, manganese sulfites and tin sulfites. The clay minerals are mostly of natural origin and may, for example, include kaolin, activated clay, quartz sand, diatomaceus earth, baryte, talc, pearlite, bentonite and montmorillonite.

Among the inorganic particulates described above, it is preferable to use the metal carbonates, metal oxides, metal hydroxides, metal phosphates, etc., which are readily decomposed by a strong acid such as hydrochloric acid for their removal.

A variety of water-soluble inorganic salts may be employed for dissolving in the aqueous solution. The salt is added for the purpose of reducing the dissolving of the above-described monomer(s) into the aqueous solution and thereby facilitating the formation of the oil droplets of the monomer(s) in the reaction system. Therefore, no particular restrictions are imposed on them as far as they are soluble in water. Specifically, as salts of monobasic acids may be mentioned various halides, nitrates, perchlorates, etc. On the other hand, as salts of polybasic acids may be cited alkali metal or ammonium salts of sulfuric acid, carbonic acid, phosphoric acid, silicic acid, aluminic acid, etc. For example, the halides may include lithium chloride, sodium chloride, potassium chloride, ammonium chloride, lithium bromide, sodium bromide, potassium bromide, ammonium bromide, calcium bromide, lithium iodide, sodium iodide, potassium iodide, calcium chloride, barium chloride, magnesium chloride, aluminum chloride, zinc chloride, etc. The nitrates may embrace lithium nitrate, sodium nitrate, potassium nitrate, ammonium nitrate, calcium nitrate, magnesium nitrate, barium nitrate, zinc nitrate, aluminum nitrate, lead nitrate, etc. The perchlorates may include lithium perchlorate, sodium perchlorate, potassium perchlorate, barium perchlorate, magnesium perchlorate, etc. The sulfates include lithium sulfate, sodium sulfate, potassium sulfate, ammonium sulfate, aluminum sulfate, etc. The carbonates embrace lithium carbonate, sodium carbonate, potassium carbonate, sodium hydrogencarbonate, potassium hydrogencarbonate, ammonium carbonate, ammonium hydrogencarbonate, etc. As the phosphates, there are three kinds of salts, i.e., the primary, secondary and tertiary salts. The primary salts include sodium primary phosphate, potassium primary phosphate, ammonium primary phosphate, calcium primary phosphate, etc., the secondary salts including sodium secondary phosphate, potassium secondary phosphate, ammonium secondary phosphate, etc,, and the tertiary salts include sodium tertiary phosphate, potassium tertiary phosphate, ammonium tertiary phosphate, etc. The silicates may cover sodium silicate, potassium silicate, etc., while the aluminates comprise sodium aluminate, potassium aluminate, etc. It is also possible to use complex salts comprising at least two compounds represented by alum compounds such as potassium alum, ammonium alum and sodium alum, or to use two or more of the foregoing water-soluble inorganic salts in combination.

Particularly preferred water-soluble inorganic salts among those cited above are the halides, sulfates, phosphates, etc. in practicing the preparation process of the present invention.

Further, the aforesaid water-soluble inorganic salt may be used in any concentration of supersaturation, saturation or below saturation in the aqueous solution. Since the purpose of the addition of the water-soluble inorganic salt is to decrease the solubility of the aforesaid monomer(s) in the aqueous solution, it is preferable to carry out the polymerization at a salt concentration in the vicinity of its saturation or at least 50% of the saturation. However, the solubilities of the aforesaid water-soluble inorganic salts in water vary greatly with temperature, so that it is preferable to determine their amount of addition in view of the polymerization temperature.

Then, an aqueous medium is prepared by suspending the aforesaid inorganic particulates in the aqueous inorganic salt solution. To suspend the inorganic particulates, commonly available agitation and mixing apparatus may be used. Specifically, paddle agitator, propeller-type agitator, turbine-type agitator, disc or truncated cone agitator, reciprocating agitator, jet agitator, line agitation mixer, etc. are mentioned.

Polymerization is conducted by dispersing the aforesaid monomer(s) in the inorganic salt solution containing inorganic particulates thus-suspended. The ratio of the monomer(s) to the aqueous solution is in the range of 6/4–0.5/9.5, preferably 5/5–1/9 in terms of the ratio of the monomer/aqueous solution. As the monomer ratio increases excessively, the resulting polymer granules are liable to merge, unfavorably leading to failure in the production of desired granular polymer. On the other hand, too small monomer ratio results in a smaller production per batch, which is uneconomical, although desired granular polymer can be prepared favorably owing to no occurrence of the merger of the polymer granules. The agitation speed for dispersing the monomer(s) during the polymerization is 50–2,000 rpm, preferably 100–1,500 rpm.

Thus, the polymerization is initiated by dispersing the monomer(s) in the inorganic salt solution with inorganic particulates suspended, as described above. As the polymerization initiator used therein, oil-soluble radical initiators ar favored and used commonly by dissolving them in the monomer(s). Specifically, there are initiators made of peroxides, azo compounds, etc. The peroxide initiators may include ketone peroxides such as methyl ethyl ketone peroxide, methyl isobutyl ketone peroxide and cyclohexanone peroxide, diacyl peroxides such as acetyl peroxide, propionyl peroxide and benzoyl peroxide, hydroperoxides such as t-butyl hydroperoxide, cumene hydroperoxide and di-isopropylbenzene hydroperoxide, dialkyl peroxides such as di-t-butyl peroxide, t-butylcumyl peroxide and dicumyl peroxide, peroxyketals such as 1,1-bis-t-butylperoxy-3,3,5-trimethylcyclohexane, alkyl peresters such as t-butyl peroxyacetate, t-butyl peroxyisobutyrate, t-butyl peroxy-2-ethylhexanoate, t-butyl peroxypivalate and t-butyl peroxybenzoate, peroxycarbonates such as di-2-ethylhexyl peroxydicarbonate, di-isopropyl peroxydicarbonate and di-methoxyisopropyl peroxydicarbonate. Further, coexistence of the aforesaid peroxide with an amine such as dimethylaniline makes it also possible to lower the polymerization initiation temperature by the formation of an oxidation-reduction system.

On the other hand, as the azo compound initiators may be mentioned, for example, azobisisobutyronitrile, azobis(2,4-dimethylvaleronitrile), (1-phenylethyl)azodiphenylmethane, dimethyl-2,2'-azobisisobutyrate and azobis(isobutyramide). The amount of the initiator to be added varies with its kind and the polymerization temperature and hence is not unconditional, but it ranges generally from 0.05 to 7% by weight, preferably from 0.1 to 5% by weight. The polymerization temperature is generally in the range of 40°–100° C., though it varies with the kind of the monomer(s) and the composition. It is not necessary to maintain the temperature constant during polymerization and therefore the temperature may be raised so as to complete the polymerization at the late stage of polymerization.

In practice an inorganic salt solution suspended with inorganic particulates must first be prepared in the course of producing a granular polymer. To prepare the solution, an inorganic salt is first dissolved in water and the resulting solution is added and suspended with inorganic particulates; inorganic particulates are suspended in water in advance, into which a water soluble inorganic salt is added and dissolved; or inorganic particulates and a water-soluble inorganic salt are added into water together so as to be suspended and dissolved respectively. All of these procedures can be adopted.

Then, a monomer(s) is added to the aqueous solution thus-prepared and dispersed therein as monomer oil droplets. At this time, it is preferable to add a polymerization initiator to the monomer(s) beforehand. The agitation speed at this time is 50–2,000 rpm, preferably 100–1,500 rpm. The speed is not required to be maintained constant during polymerization so that it may be controlled in accordance with the dispersed state of the granules. In this case, it is preferable to keep the atmosphere in the reaction system in the state of low oxygen content, or practically to substitute an inert gas such as nitrogen for the atmosphere. The polymerization temperature is generally 40°–100° C. and is not required to be maintained constant during polymerization, as described above.

The polymerization time varies significantly with the kind of the monomer(s) used and generally ranges from 1 to 48 hours with no particular limitations. In the polymerization, the addition of an aqueous monomer solution having the same or different composition may cause an enlargement, composition change, etc. of the polymer granules.

The follow-up of the polymerization state can be confirmed by sampling the polymer and determining the formation of polymer granules, the reduction rate of the monomer(s), etc.

The granular polymer can be obtained by carrying out the polymerization at a certain temperature during a certain period of time as described above and then filtering the resulting polymerization liquid. As a method for the filtration, pressure filtration, vacuum filtration, gravity filtration, centrifugation, etc. may be employed.

The granular polymer so obtained may be washed with a solvent such as water to remove the inorganic particulates attached to the surface of the granules, or may be treated with an aqueous solution containing a strong acid such as hydrochloric and sulfuric acids when the inorganic particulates are to be removed completely from the surface of the granules. When used in a wet state, the granular polymer may be used as is, while when used as dry granules, it must be dried by a conventional procedure.

The granular polymer produced in the above manner is of spherical granules having granular sizes in the range of 10–1,000 μm, and the granular sizes and their distribution are affected by the agitation speed, the volume ratio of the monomer(s) to the aqueous solution, etc., the granular sizes being smaller and their distribution narrower at higher agitation speeds and lower monomer ratios.

It is confirmed by means of an optical microscope that the granular polymer obtained is glassy transparent beads, the beads being a perfect transparent body composed only of the polymer in the interior of which no inorganic particulates are contained. Further, porous beads (beads having a large number of pores) may also be prepared by the optional selection of an organic liquid which is added to the monomer(s). In this case, the beads are not transparent to all outward appearance.

Further, the granular polymer turns into gel by absorbing water and swelling. In many cases, the degree of swelling of the gel varies with temperature. The lower the temperature, the higher is the degree of swelling, but with increasing temperature, the gel contracts and the degree of swelling is decreased. The degree of swelling varies with the proportion of the crosslinking monomer, the proportion of the monomer(s), etc. and is generally about 100 times the weight of the polymer at 10° C., reaching a maximum, and commonly 10 times or less the weight at 60° C. This cycle can be repeated a desired number of times.

On the other hand, the granular polymer also swells to form a gel in an alcohol such as methanol and ethanol, a ketone such as acetone and methyl ethyl ketone or a polar solvent such as tetrahydrofuran, dioxane and N,N-dimethylacrylamide, in the same manner as in water. Regulation of the monomer composition allows the granular polymer to have a higher degree of swelling in the foregoing solvents than in water. Here, a water-containing solvent may also be used.

Being spherical granules in shape, the granular polymer produced according to the process of the present invention is much easier to handle than the powdered products, etc., and its degree of swelling with water can vary with temperature by nature, so that it is employed in a wide variety of fields. Specifically, the granular polymer can be used to concentrate various aqueous solutions, particularly as a concentrating agent of aqueous solutions containing substances susceptible to deteriorate by heat, such as, foods, amino acids, proteins, polysaccharides, enzymes, emulsions, etc., which are difficult to concentrate by the vaporization process, and also used for the water-retention and moisture-control of the soil as a water-holding agent. Moreover, the granular polymer may also be employed as base materials for chromatography such as gel filtration agents and adsorbents and as microcarriers for cells, with sufficient display of the effectiveness of the granular shape. On the other hand, the granular polymer also swells with organic solvents such as alcohols, acetone, dimethylformamide, dioxane, etc., in addition to water. Making use of such characteristics, the granular polymer may also be used as the carriers of slow-releasing base materials including medicaments, agricultural chemicals and fertilizers.

The present invention will be illustrated concretely by reference to the following examples.

EXAMPLE 1

Into a 500 ml, 4-necked, round bottom, cylindrical separable flask equipped with an agitator, thermometer, cooler and nitrogen inlet was fed 200 ml of a slurry (viscosity at 40° C.:2,940 centipoises) formed by dispersing 110 g of calcium carbonate [manufactured by Shiraishi Kogyo K. K. (Shiraishi Industry Co., Ltd.), mean particle size : 0.15 μm] uniformly in 220 ml of an ion exchange water. T the slurry, 60.2 g of anhydrous sodium sulfate and 6.5 g of sodium tertiary phosphate dodecahydrate were added as the water-soluble inorganic salts at 40° C. and agitated for 10 minutes. Then, the aqueous solution was subjected to nitrogen replacement for 30 minutes under agitation by way of the nitrogen inlet.

Then, 16.42 g of N-acryloylpyrrolidine (abbreviated as N-APR hereinafter), 0.16 g of ethyleneglycol dimethacrylate (abbreviated as EGDMA hereinafter), and 3.42 g of styrene (abbreviated as St hereinafter) were mixed, to which 0.4 g of t-butyl-peroxy-2-ethylhexanoate (abbreviated as perbutyl O hereinafter) was added after nitrogen replacement.

The foregoing monomer mixture was added under agitation to the above-prepared aqueous slurry solution in a stream of nitrogen and the agitation was continued while gradually increasing the agitation speed eventually to 220 rpm. After agitation for 15 minutes, the reaction temperature was raised to 60° C. at which the monomers were polymerized for 4 hours and then to 70° C. at which the polymerization was continued for 2 hours. Following the polymerization for the predetermined period of time, the reaction mixture was poured through a 400 mesh filter cloth to separate out beads by filtration. After washing sufficiently with a large volume of flowing water, the beads were immersed in 300 ml of 2N hydrochloric acid for 30 minutes, whereby the remaining calcium carbonate was completely decomposed.

Thereafter, the beads were filtered by means of a 400 mesh filter cloth, washed with water and then immersed in a large volume of water. After filtration with the filter cloth again, the beads were dried at 60° C. for 5 hours to obtain a granular polymer.

The granular polymer thus obtained was spherical, transparent, uniform beads. The yield of the granular polymer was 93%. The granular polymer obtained was sieved and its size distribution was measured. The results are given in Table 7.

The yield of the granular polymer was 93%.

Then, the granular polymer was allowed to swell in distilled water, ethanol and an aqueous ethanol solution (ethanol/water=7/3 in volume ratio), and its swelling volumes were measured by changing temperature. The swelling volumes per gram of the granular polymer were calculated and the results are given respectively in Tables 2–4.

EXAMPLES 2–4

Production of granular polymers was conducted in the same manner as in Example 1 except that the monomer compositions was an given in Table 1. In all of the cases, polymerization proceeded in the monomers being uniformly dispersed and the polymers were obtained as spherical granules. The yields are given in Table 1.

The granular polymers thus obtained were spherical, transparent, uniform beads. The granular polymers obtained were sieved and their size distributions were measured. The results are given in Table 7.

Then, the granular polymers were allowed to swell in distilled water, ethanol, an aqueous ethanol solution (ethanol/water=7/3 in volume ratio) and their swelling volumes were measured by changing temperature. The results are given respectively in Tables 2-4. As seen in these tables, the volume changes significantly- with temperature in water. In ethanol (or aqueous ethanol), the granular polymers show high degrees of swelling, but their changes in volume with temperature are small.

TABLE 1

| Example | Monomer Composition (g) | | | Yield (%) |
|---|---|---|---|---|
| | N-APR | St. | EGDMA | |
| 1 | 16.42 | 3.42 | 0.16 | 93 |
| 2 | 14.62 | 5.21 | 0.17 | 95 |
| 3 | 12.76 | 7.08 | 0.17 | 97 |
| 4 | 10.82 | 9.01 | 0.17 | 98 |

TABLE 2

| Example | Swelling Volume in Water (ml/g) | | | | | | | |
|---|---|---|---|---|---|---|---|---|
| | 5° C. | 10° C. | 20° C. | 30° C. | 40° C. | 50° C. | 60° C. | 70° C. |
| 1 | 7.3 | 6.8 | 5.4 | 4.3 | 3.4 | 2.9 | 2.7 | 2.6 |
| 2 | 4.2 | 4.0 | 3.5 | 3.0 | 2.6 | 2.4 | 2.4 | 2.4 |
| 3 | 2.7 | 2.7 | 2.7 | 2.6 | 2.5 | 2.3 | 2.1 | 2.1 |
| 4 | 2.3 | 2.3 | 2.3 | 2.2 | 2.2 | 2.1 | 2.0 | 2.0 |

TABLE 3

| Example | Swelling Volume in Ethanol (ml/g) | | | | | | | |
|---|---|---|---|---|---|---|---|---|
| | 5° C. | 10° C. | 20° C. | 30° C. | 40° C. | 50° C. | 60° C. | 70° C. |
| 1 | 13.3 | 13.2 | 13.1 | 12.9 | 12.6 | 12.5 | 12.4 | 12.3 |
| 2 | 12.4 | 12.3 | 12.3 | 12.3 | 12.2 | 12.0 | 11.9 | 11.6 |
| 3 | 9.5 | 9.4 | 9.4 | 9.3 | 9.3 | 9.3 | 9.3 | 9.2 |
| 4 | 8.8 | 8.8 | 8.8 | 8.7 | 8.7 | 8.7 | 8.7 | 8.7 |

TABLE 4

| Example | Swelling Volume in Aqueous Ethanol (Ethanol/Water = 7/3 by Volume) (ml/g) | | | | | | | |
|---|---|---|---|---|---|---|---|---|
| | 5° C. | 10° C. | 20° C. | 30° C. | 40° C. | 50° C. | 60° C. | 70° C. |
| 1 | 13.3 | 13.0 | 12.6 | 12.3 | 12.0 | 11.9 | 11.7 | 11.6 |
| 2 | 11.1 | 10.8 | 10.7 | 10.5 | 10.4 | 10.1 | 9.9 | 9.7 |
| 3 | 7.2 | 7.2 | 7.2 | 7.2 | 7.1 | 7.1 | 7.1 | 6.8 |
| 4 | 5.8 | 5.8 | 5.8 | 5.7 | 5.7 | 5.7 | 5.7 | 5.5 |

EXAMPLE 5

A uniform aqueous slurry solution was prepared by dissolving 67.3 g of anhydrous sodium sulfate in 220 ml of an ion exchange water at 40° C. followed by addition and dispersion of 110 g of calcium phosphate [manufactured by Taihei Kagaku K. K. (Taihei Chemical Co., Ltd.), mean particle size : 0.2 μm].

Into the 500 ml, 4-necked, round bottom flask used in Example 1 was added 200 ml of the above-prepared aqueous slurry solution, and the interior of the flask was replaced with nitrogen under agitation for 30 minutes by way of the nitrogen inlet.

Separately, 12.87 g of N-APR and 7.13 g of St were mixed, and 0.4 g of perbutyl O was added thereto after nitrogen replacement.

The foregoing monomer mixture was added to the above-prepared aqueous slurry solution under agitation in a stream of nitrogen, and the agitation was continued while gradually increasing the agitation speed eventually to 220 rpm. After agitation for 15 minutes, the reaction temperature was raised to 60° C. at which the monomers were polymerized for 4 hours, and then to 70° C. at which a 2 hour polymerization was carried out. After the polymerization for the predetermined period of time, the reaction mixture was poured to a 400 mesh filter cloth to separate out beads by filtration. After sufficient washing with a large volume of flowing water, the beads were filtered again with the filter cloth and then dried at 60° C. for 5 hours to obtain a granular polymer.

The granular polymer thus obtained was spherical, transparent, uniform beads. During the drying, no adherence of the dried granules occurred to the beaker wall due to their electric charges The granular polymer obtained was sieved and its size distribution was measured. The results are given in Table 7.

The yield of the granular polymer was 96%.

Then, the granular polymer was allowed to swell in distilled water and its swelling volumes were measured by changing temperature. The swelling volumes per gram of the granular polymer were calculated and the results are given in Table 5.

EXAMPLES 6-9

Granular polymers were produced in the same manner as in Example 5 except for the polymerization conditions given in Table 5. In all of the examples, polymerization proceeded in the monomers being uniformly dispersed and the polymers were obtained as spherical granules. The yields are given in Table 5.

Then, the granular polymers were allowed to swell in distilled water and their swelling volumes were measured by changing temperature. The results are given in Table 6.

TABLE 5

| Example | Monomer Composition (g) | | Polymerization Initiator (g) | Inorganic Particulates (g) | Yield (%) |
|---|---|---|---|---|---|
| 5 | N-APR | 12.87 | perbutyl O 0.04 | calcium phosphate 155 (Taihei Kagaku K.K.; mean size 0.2 μm) | 96 |
| | St | 7.13 | | | |
| 6 | N-APR | 14.76 | perbutyl O 0.15 | calcium carbonate 130 (Bihoku Funka K.K.; mean size 0.2 μm) | 93 |
| | EGDMA | 0.24 | | | |
| 7 | N-APR | 15.66 | perbutyl O 0.40 | kaolinite 140 (China Clay, England; mean size 5 μm) | 96 |
| | DEAA*1 | 23.70 | | | |
| | EGDMA | 0.64 | | | |
| 8 | N-APR | 18.65 | perbutyl O 0.15 | calcium carbonate 155 (Shiraishi Kogyo K.K.; mean size 0.1 μm) | 95 |
| | N-APP*2 | 10.87 | | | |
| | EGDMA | 0.48 | | | |

*1 N,N-diethylacrylamide
*2 N-acryloylpiperidine

TABLE 6

| Example | Swelling Volume (ml/g) | | | |
|---|---|---|---|---|
| | 10° C. | 30° C. | 50° C. | 70° C. |
| 5 | 3.1 | 3.1 | 2.7 | 2.5 |
| 6 | 23.2 | 16.2 | 8.0 | 4.5 |
| 7 | 19.6 | 12.5 | 7.1 | 3.6 |

TABLE 6-continued

| Example | Swelling Volume (ml/g) | | | |
|---|---|---|---|---|
| | 10° C. | 30° C. | 50° C. | 70° C. |
| 8 | 14.3 | 9.7 | 5.1 | 3.5 |

Comparative Example 1

An attempt was made to produce a granular polymer in the same manner as in Example 1 except that 60.2 g of the anhydrous sodium sulfate and 6.5 g of the sodium tertiary phosphate dodecahydrate used in Example 1 were not added.

After polymerization for the predetermined period of time, the reaction mixture was filtered by a 400 mesh filter cloth, but no granular polymer was found to be formed.

Comparative Example 2

An attempt was made to produce a granular polymer in the same manner as in Example 1 except that the calcium carbonate used in Example 1 was not added.

Upon 30 minutes after initiation of the polymerization, a polymer was precipitated and coagulated, but no granular polymer could be produced.

TABLE 7

| Example | Size Distribution (% by weight) | | | | | |
|---|---|---|---|---|---|---|
| | 75 μm or smaller | 75-149 μm | 149-210 μm | 210-300 μm | 300-500 μm | 500 μm or larger |
| 1 | 0.8 | 4.2 | 10.6 | 36.2 | 38.6 | 9.6 |
| 2 | 0.7 | 3.2 | 8.2 | 35.7 | 44.9 | 7.3 |
| 3 | 0.5 | 5.5 | 11.3 | 34.4 | 37.9 | 10.4 |
| 4 | 0.4 | 6.1 | 11.8 | 35.1 | 35.7 | 10.9 |
| 5 | 0.4 | 5.1 | 11.3 | 38.1 | 34.8 | 10.3 |
| 6 | 0.8 | 4.4 | 11.4 | 37.5 | 36.3 | 9.6 |
| 7 | 0.7 | 4.8 | 10.8 | 37.2 | 36.4 | 10.1 |
| 8 | 0.6 | 5.0 | 11.1 | 36.3 | 39.2 | 7.8 |
| 9 | 0.8 | 4.9 | 10.7 | 38.4 | 36.0 | 9.2 |
| 10 | 0.8 | 5.1 | 10.9 | 38.6 | 34.6 | 10.0 |
| 11 | 0.7 | 4.7 | 10.3 | 37.5 | 37.9 | 8.9 |
| 12 | 0.5 | 5.3 | 11.8 | 39.0 | 33.3 | 10.1 |
| 13 | 0.9 | 6.1 | 12.1 | 38.3 | 33.0 | 9.6 |

TABLE 8

| Example | Monomer Composition (g) | | Polymerization Initiator (g) | Inorganic Particulates (g) | Yield (%) |
|---|---|---|---|---|---|
| 9 | DMAA*[1] | 12.41 | perbutyl O | calcium carbonate 155 (Shiraishi Kogyo K.K.; mean size 0.1 μm) | 95 |
| | N-EMAA*[2] | 10.70 | | | |
| | PDA*[3] | 0.39 | 0.25 | | |
| 10 | N-n-PAA*[4] | 13.15 | AiBN*[9] | calcium carbonate 155 (Shiraishi Kogyo K.K.; mean size 0.1 μm) | 96 |
| | MBA*[5] | 0.25 | 0.35 | | |
| 11 | N-EAA*[6] | 12.65 | AiBN*[9] | calcium carbonate 155 (Shiraishi Kogyo K.K.; mean size 0.1 μm) | 96 |
| | N-APP | 9.27 | 0.35 | | |
| | EGDMA | 0.28 | | | |
| 12 | N-AMR*[7] | 12.32 | perbutyl O | titanium oxide 200 (Sakai Kagaku K.K.; mean size 0.2 μm) | 95 |
| | N-n-BAA*[8] | 4.66 | | | |
| | EGDMA | 0.12 | 0.25 | | |
| 13 | DEAA | 13.15 | AiBN*[9] | calcium carbonate 200 (Toyo Fine Chemical; mean size 0.1 μm) | 91 |
| | PDA*[3] | 0.25 | 0.35 | | |

*[1] N,N-dimethylacrylamide.
*[2] N-ethylmethacrylamide.
*[3] Piperidine diacrylamide
*[4] N-n-propylacrylamide.
*[5] Methylenebisacrylamide.
*[6] N-ethylacrylamide
*[7] N-acryloyl morpholine.
*[8] N-n-butylacrylamide.
*[9] Azobisisobutyronitrile

EXAMPLES 9-13

Granular polymers were produced in the same manner as in Example 5 except for the polymerization conditions given in Table 8. In all of the examples, polymerization proceeded in the monomers being dispersed uniformly and the polymers were obtained as spherical granules. The granular polymers obtained were spherical, transparent, uniform beads. No adherence of the dried granules occurred to the beaker walls due to their electric charges. The yields are given in Table 6, while the measurements of the granular size distributions by sieving are shown in Table 7

Comparative Example 3

An attempt was made to produce a granular polymer in the same manner as in Example 1 except that granular lime stone [manufactured by Nitchitsu Kogyo K. K. (Nitchitsu Industries Co., Ltd.), mean particle size : 80 μm] was used as the calcium carbonate in Example 1. After polymerization for the predetermined period of time, the reaction mixture was filtered by a 400 mesh filter cloth, but entirely no granular polymer was formed.

EXAMPLE 14

Two grams of the granular polymer prepared in Example 11 was added to 100 ml of an aqueous solution containing 350 ppm chloramphenicol and the resulting mixture was agitated at 40° C. for 15 minutes. Thereafter, the mixture was filtered by means of a glass filter to obtain a swelled gel.

In a glass column with an inner diameter of 1.0 cm and a length of 10 cm was packed 0.50 g of the swelled gel (chloramphenicol content: 1.6 mg), and distilled water was passed through the column at 0.5° C. at the rate of 3.5 ml/min. It was found that 95% of the content was released during 1.5 hours.

On the other hand, a release test was carried out at 60° C. in the same manner as described above, with the result that 67% of the retained amount was released during 5 hours. Thus, it is evident that the release effect varies with temperature.

EXAMPLE 15

To 50 ml of an aqueous solution having 122 ppm benzoic acid dissolved was added 0.25 g of the granular polymer prepared in Example 8, and the mixture was allowed to stand overnight under agitation at the prescribed temperature. After standing for the predetermined period of time, the concentration of benzoic acid in the supernatant was measured and the amounts of adsorption per gram of the polymer were calculated.

The amount of adsorption at 5° C. was 1.6 mg/g of the polymer, while at 40° C. it was 6.8 mg/g of the polymer. The effects of adsorption varying with temperature are definitely illustrated.

We claim:

1. A preparation process of a granular polymer which comprises dispersing and polymerizing at least one N-alkyl- or N-alkylene-substituted (meth)acrylamide represented by the general formula (I) or (II):

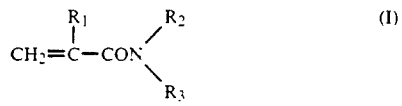

wherein $R_1$ is a hydrogen atom or a methyl group, $R_2$ is a hydrogen atom or a methyl or ethyl group, and $R_3$ is a methyl, ethyl or propyl group,

wherein $R_1$ is a hydrogen atom or a methyl group and A is $-CH_2\!\!\frac{}{}_n$ wherein n is 4–6 or $-CH_2\!\!\frac{}{}_2O-CH_2\!\!\frac{}{}_2$, or a mixture of at least one of the above-described N-alkyl or N-alkylene-substituted (meth)acrylamides and other copolymerizable monomer in a medium consisting of an aqueous inorganic salt solution having a viscosity of 10–20,000 centipoises in which fine inorganic particulates are suspended, wherein the particle sizes of the fine inorganic particulates are in the range of 0.005–50 μm and are present in an amount of 10 to 60%s by weight based on the aqueous solution and wherein the concentration of the inorganic salt in the aqueous solution is a concentration in the vicinity of the saturated solubility thereof.

2. The preparation process as claimed in claim 1 wherein the fine inorganic particulates are those selected from the group consisting of metal carbonates, metal oxides, metal hydroxides, metal phosphates, metal sulfates,.metal sulfites and clay minerals.

3. The preparation process as claimed in claim 1 wherein the N-alkyl- or N-alkylene-substituted (meth)acrylamide represented by the general formula (I) or (II) is one selected from the group consisting of N-ethylacrylamide, N,N- diethylacrylamide, N-ethylmethacrylamide, N,N-dimethylacrylamide, N,N-dimethylmethacrylamide, N-n-propylacrylamide, N-acryloylpyrrolidine, N-methacryloylpyrrolidine, N-acryloylpiperidine and N-acryloylmorpholine.

4. The preparation process as claimed in claim 1 wherein the other copolymerizable monomer is a lipophilic monomer.

5. The preparation process as claimed in claim 1 wherein the inorganic salt is a salt of a monobasic acid selected from the group consisting of halides, nitrates and perchlorates or a salt of a polybasic acid selected from the group consisting of alkali metal or ammonium salts of sulfuric acid, carbonic acid, phosphoric acid, silicic acid and aluminic acid.

6. The preparation process as claimed in claim 1 wherein the ratio of the monomer or monomers to the aqueous solution in the aqueous inorganic salt solution having the inorganic particulates suspended is 6/4–0.5/9.5 in terms of the monomer/aqueous solution ratio by volume.

7. The preparation process as claimed in claim 1 wherein the monomer/aqueous solution ratio is 5/5–1/9.

8. The preparation process as claimed in claim 1 wherein the polymerization is carried out in the presence of a radical polymerization initiator of peroxide type or azo compound type.

9. The preparation process as claimed in claim 1 wherein the polymerization is conducted by preparing the aqueous inorganic solution having the inorganic particulate suspended and then adding the monomer or monomers thereto.

10. The preparation process as claimed in claim 1 wherein the polymerization is conducted at 40°–100° C. in an atmosphere of an inert gas.

11. The preparation process as claimed in claim 1 wherein. the inorganic particulates are dissolved and removed from the granular polymer obtained by a solvent or strong acid.

12. The preparation process as claimed in claim 1 wherein the sizes of the granular polymer are 10–1,000 μm.

* * * * *